United States Patent
Sengupta et al.

(10) Patent No.: US 12,246,765 B2
(45) Date of Patent: Mar. 11, 2025

(54) SYSTEM FOR SECURING COMMUNICATION BETWEEN CENTRAL CONTROLLER AND SIGNALING DEVICES IN TRAFFIC SIGNALING NETWORKS

(71) Applicant: Tata Consultancy Services Limited, Mumbai (IN)

(72) Inventors: Siddhartha Sengupta, Mumbai (IN); Sandeep Patalay, Hyderabad (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 17/593,441

(22) PCT Filed: Mar. 18, 2020

(86) PCT No.: PCT/IB2020/052454
§ 371 (c)(1),
(2) Date: Sep. 17, 2021

(87) PCT Pub. No.: WO2020/188493
PCT Pub. Date: Sep. 24, 2020

(65) Prior Publication Data
US 2024/0425094 A1  Dec. 26, 2024

(30) Foreign Application Priority Data
Mar. 18, 2019  (IN)  ............ 201921010528

(51) Int. Cl.
*B61L 27/70* (2022.01)
*H04L 67/12* (2022.01)
*H04L 69/40* (2022.01)

(52) U.S. Cl.
CPC .............. *B61L 27/70* (2022.01); *H04L 67/12* (2013.01); *H04L 69/40* (2013.01)

(58) Field of Classification Search
CPC ................. B61L 27/70; H04L 37/12
See application file for complete search history.

(56) References Cited

U.S. PATENT DOCUMENTS

2005/0099319 A1   5/2005   Hutchison et al.
2009/0143928 A1   6/2009   Ghaly
(Continued)

FOREIGN PATENT DOCUMENTS

CN   101470964 A   7/2009
CN   101572008 A   11/2009
(Continued)

OTHER PUBLICATIONS

International Search Report and Written Opinion mailed Jul. 27, 2020, in International Application No. PCT/IB2020/052454; 6 pages.

*Primary Examiner* — Long T Tran
(74) *Attorney, Agent, or Firm* — FINNEGAN, HENDERSON, FARABOW, GARRETT & DUNNER LLP (57) ABSTRACT

The present disclosure provides a system for securing communication between Central Controller and signaling devices including actuator devices and signaling sensors used in railway and road traffic signaling networks. Conventional signaling systems use unsecured metal cables to communicate between the Central Controller and the signaling devices, making them vulnerable to unauthorized intrusion and mischief. In the present disclosure, two uniquely addressable communication modules, one (SCM1) securely housed with the Central Controller and another (SCM2) securely housed in an assembly also containing the signaling device and the related power switches are used to establish a transparent but standard secure digital communication protocol between them to authenticate and validate (Continued)

mutual communication, making them secure and safe from intrusion and undesirable manipulation.

7 Claims, 6 Drawing Sheets

(56) References Cited

U.S. PATENT DOCUMENTS

| | | | |
|---|---|---|---|
| 2011/0085470 A1* | 4/2011 | Park | H04L 65/1069 |
| | | | 370/254 |
| 2011/0204189 A1 | 8/2011 | Lynch et al. | |
| 2013/0217332 A1* | 8/2013 | Altman | G06Q 20/3224 |
| | | | 455/3.01 |
| 2015/0154860 A1 | 6/2015 | Holzwanger et al. | |
| 2015/0232110 A1 | 8/2015 | Ghaly | |
| 2017/0125892 A1* | 5/2017 | Arbabian | A61B 5/0024 |

FOREIGN PATENT DOCUMENTS

| | | |
|---|---|---|
| CN | 104135469 B | 11/2017 |
| WO | WO2005/113315 A1 | 12/2005 |
| WO | WO2007/006684 A1 | 1/2007 |

* cited by examiner

FIG. 1A (Prior-art)

FIG. 1B
(Prior-art)

FIG. 1C (Prior-art)

(Prior-art)

FIG. 1D

FIG. 1E (Prior-art)

FIG. 2

SYSTEM FOR SECURING COMMUNICATION BETWEEN CENTRAL CONTROLLER AND SIGNALING DEVICES IN TRAFFIC SIGNALING NETWORKS

CROSS REFERENCE TO RELATED PATENT APPLICATIONS AND PRIORITY

The present application is a U.S. National Stage Filing and claims priority from International Application No. PCT/IB2020/052454 filed on Mar. 18, 2020, which application claims priority from India Patent Application No. 201921010528, filed on Mar. 18, 2019. The complete disclosures of the referenced applications in their entireties are herein incorporated by reference.

TECHNICAL FIELD

The disclosure herein generally relates to secure communication in traffic signaling network, and particularly to system for securing communication between Central Controller and signaling devices including signaling sensors and actuator devices in railway and road traffic signaling networks.

BACKGROUND

Traffic signal network systems involving control systems and signaling devices are designed to allow vehicles to safely cross shared paths while maintaining an efficient flow of traffic. For railways such signaling devices have evolved over time and include of Route Relay Interlocking (RRL), Panel Interlocking (PI), Centralized Solid State (or Electronic) Interlocking and Electronic Interlocking (EI) with object controllers. Road signaling devices typically have Central Controller that read from sensors and send status change signals to traffic lights or gates. For legacy systems in both railways and roadways, while core input, output and processing supervisory or control systems ensure proven safety and are housed in secure locations or assemblies, much of cabling that may run through unprotected trenches dug between Central Controller and unprotected signaling sensors and actuator devices in a field.

The unsecure physical links running over them lead to serious vulnerabilities, especially from intrusion for malevolent purposes and may lead to great damage to public safety and infrastructure in the form of accidents, collisions and traffic congestions.

Protecting a communication between the Central Controller and signaling devices including signaling sensors and actuator devices or their assemblies from such malevolent intrusions is a critical but challenging and expensive task for traffic control departments. Hence a simple but inexpensive and retrofit-able safety or security mechanism for railway and roadway signaling networks is of prime importance in legacy traffic signaling systems.

SUMMARY

Embodiments of the present disclosure present technological improvements as solutions to one or more of the above-mentioned technical problems recognized by the inventors in conventional systems.

In an aspect, there is provided a system for securing communication between a Central Controller and a plurality of signaling devices in railway or road traffic signaling networks, the Central Controller comprising a relay rack or an object controller, which comprises at least one input relay and at least one output relay associated with each of the plurality of signaling devices, the system comprising:

i. a first secure communication module (SCM1) having a unique address identifier, operatively coupled to the relay rack or the object controller, and together housed in a secure control facility;

ii. at least one second secure communication module SCM2 (SCM2a, SCM2b, ... SCM2n) each having a unique address identifier, wherein each of the at least one SCM2 is integrated with a corresponding signaling device (S1, S2, ... Sn) and housed together to form a corresponding secure signaling device assembly;

iii. a physical communication link configured to establish a communication between the SCM1 and each of the at least one SCM2; and iv. a digital communication protocol, implemented between the SCM1 and the at least one SCM2 via the physical communication link, wherein the SCM1 and the at least one SCM2 establish a secure communication link between the relay rack or the object controller on one side and the plurality of signaling devices on other side and the digital communication protocol is configured to communicate relay status control commands or status information from the one side to the other side, wherein a secure transmission is performed by way of authentication using the unique address identifier of the SCM1 and the at least one SCM2 as per the digital communication protocol, and the secure communication link comprising the SCM1 and the at least one SCM2 is transparent to the Central Controller on the one side and the plurality of signaling devices on the other side.

In an embodiment, the SCM1 comprises:

i. a first digital input-output card IO1 configured to:
acquire relay ON/OFF status from spare contacts of associated output relays for one or more of the plurality of signaling devices, when triggered by a change of voltage of the relay contacts or by reading the status continuously, based on a field configuration, and transmit to an associated SCM2 with the unique address identifier of the SCM1 and the associated SCM2; and
send relay ON/OFF status acquired by an associated SCM2, into an associated input relay of the relay rack or the object controller:
based on the encrypted message and the unique address identifier of the at least one SCM2; and
based on a connected or disconnected status of the physical communication link between the SCM1 and the associated SCM2; and ii. a first processing unit P1 configured to:
encrypt the control commands and send to the associated at least one SCM2 or receive and decrypt the encrypted received messages corresponding to the relay ON/OFF status by implementing the digital communication protocol and using the unique address identifiers of the SCM1 and the associated at least one SCM2;
convert the relay ON/OFF status, acquired by the first digital input-output card IO1, into a compatible form for sending through the physical communication link with the unique address identifier of the SCM1 and the associated at least one SCM2;
detect the connected or disconnected status of the physical communication link between the SCM1 and the associated at least one SCM2;

verify the authenticity of the message from the associated SCM2 of the corresponding signaling device received through the physical communication link and the validity of the message for the input relays in the relay rack or the object controller corresponding to the associated SCM2; and perform one of (i) generating a relay ON/OFF status compatible with an associated relay to provide safe working of the railway or road traffic signaling networks, if the authentication fails or the input is invalid (ii) converting the message received from the associated SCM2 into relay ON/OFF status compatible for the intended relay, to be sent by the first digital input-output card IO1 into the designated input relays in the relay rack or the object controller, if the verification of the authenticity and the validation is successful.

In an embodiment of the present disclosure, each of the at least one SCM2 comprises:

i. a second digital input-output card IO2 configured to:
acquire a status of the corresponding signaling device, when triggered by a change of voltage of the corresponding signaling device relay contacts or by reading the status continuously, based on a field configuration;

if the corresponding signaling device is an actuator device, then send to the corresponding signaling device, the control commands received from the SCM1 to set the desired status of the associated actuator device; and acquire integrity status of the actuator device or signaling sensor assembly of the corresponding signaling device, if available; and ii. a second processing unit P2 configured to:
encrypt and send the status of the corresponding signaling device to the SCM1 or receive and decrypt messages received from the SCM1 by implementing the digital communication protocol and using the unique address identifiers of the SCM1 and the associated SCM2;

convert the status of the corresponding signaling device acquired by the second digital input-output card IO2, into a compatible form for sending through the physical communication link with the unique address identifiers of the SCM1 and the associated SCM2;

verify (i) the authenticity of the control command received from the SCM1 through the physical communication link (ii) the validity of the control command for the associated actuator device, and (iii) acquired integrity status of the actuator device or signaling sensor assembly of the corresponding signaling device;

perform one of (i) generating a message indicating failure of the verification to implement safe working of the railway or road traffic signaling networks, if the authentication fails or (ii) if the verification is successful and the corresponding signaling device is the actuator device, convert the control command received from the SCM1 into relay ON/OFF status compatible for the intended relay to be sent by the second digital input-output card IO2, to set the desired status of the corresponding actuator device; and enable the SCM1 to detect the connected or disconnected status of the physical communication link between the SCM1 and the associated SCM2.

In an embodiment, the digital communication protocol is either Hyper Text Transfer Protocol Secure (TCP/HTTPS), secure MODBUS, or Ethernet for Control Automation Technology (EtherCAT).

In an embodiment, the physical communication link is a metal cable or an Ethernet communication cable.

In an embodiment of the present disclosure, the physical communication link is a metal cable or an Ethernet communication cable that is configurable in SCM1 and SCM2.

In an embodiment, the SCM1 and the relay rack or the object controller are powered by a common power source.

In an embodiment, the at least one SCM2 and the associated signaling device are powered by a common power source.

It is to be understood that both the foregoing general description and the following detailed description are exemplary and explanatory only and are not restrictive of the embodiments of the present disclosure, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Railway and road signaling networks with Central Controller, signaling devices including signaling sensors and actuator devices are essential for guiding and controlling traffic in road and rail transport operations and play a vital role in decreasing accidents by preventing collisions and congestion. In railways, signaling sensors utilize track circuits to detect the presence of vehicles on the track. In many roadways, pressure sensor devices are embedded below the surface of the road for detection of vehicles crossing them. Signal actuator devices may be electrical or mechanical, including visible devices such as RYG (RED-YELLOW-GREEN) color lamps and light emitting devices (LEDs), audible devices such as audio addressing units and alarm units, pivoted mechanical arms, switches and point machines used in railway traffic signaling networks, etc. The signal actuator devices come in various designs depending on their usage. Typically, the signal devices are actuated based on relay ON/OFF status control signals received from Central Controller triggered by inputs received from sensors or from sources like clocks. These relay ON/OFF status signals are used to switch power from a local source to realize the desired status of the device. For example, in case of a RYG color lamp signal actuator device, the relay ON/OFF status signal may change the status of the device to have GREEN color lamp to ON and RED and YELLOW color lamps to OFF. In conventional traffic signaling systems, the Central Controller sends the relay ON/OFF status signals to a plurality of signal actuator devices in specific patterns.

The exemplary embodiments described herein rely on the railway traffic signaling networks as they are more complex and varying than for roadway traffic signaling networks. Persons skilled in the art can derive the similar improvements for roadway traffic signaling networks.

In railway traffic signaling networks, the Central Controller is typically referred as a central interlocking unit, a route relay interlocking (RRI) system, or a solid state interlocking (SSI) system, and so on; and may use, for example, object controllers, depending on the type of the railway interlocking architecture implemented for traffic signaling. While track circuits are used to sense the presence of vehicles on designated block sections, the signal actuator devices convey the status of availability of the next block section required for occupation in a direction of travel to a driver or direct a train in an intended route, when the train approaches an area where the signal actuator devices are located, and prevent collisions with other trains.

In road traffic signal networks, the Central Controller is generally called as a traffic controller box. Pressure sensors that may present beneath the road surfaces detect the presence or passing of vehicles while the signal actuator devices allow traffic to pass through from one side to another exclusively for certain duration as per their turn, for example, when the GREEN color lamp of the RYG color lamp is ON.

In the existing legacy art, the signaling sensors and actuator devices are connected to the Central Controller with metal cables, in particular copper cables. These cables pass through trenches in generally unsecured territory while the communication protocols also lack the capability to protect and secure the communications from malevolent intrusions and other vulnerabilities primarily because neither the signaling sensors nor the actuator devices are digitally addressable. As a result, there may be a great damage to public safety and infrastructure.

In accordance with the present disclosure, the signaling sensor and actuator device assemblies are made addressable and a secure, transparent, cryptography-enabled standard industrial digital communication mechanism is established between the signaling sensors and actuator devices within their assemblies in the field and the Central Controller in secure locations or assemblies. This ensures that the railway or roadway traffic is both safe and secure.

Figure 1A:
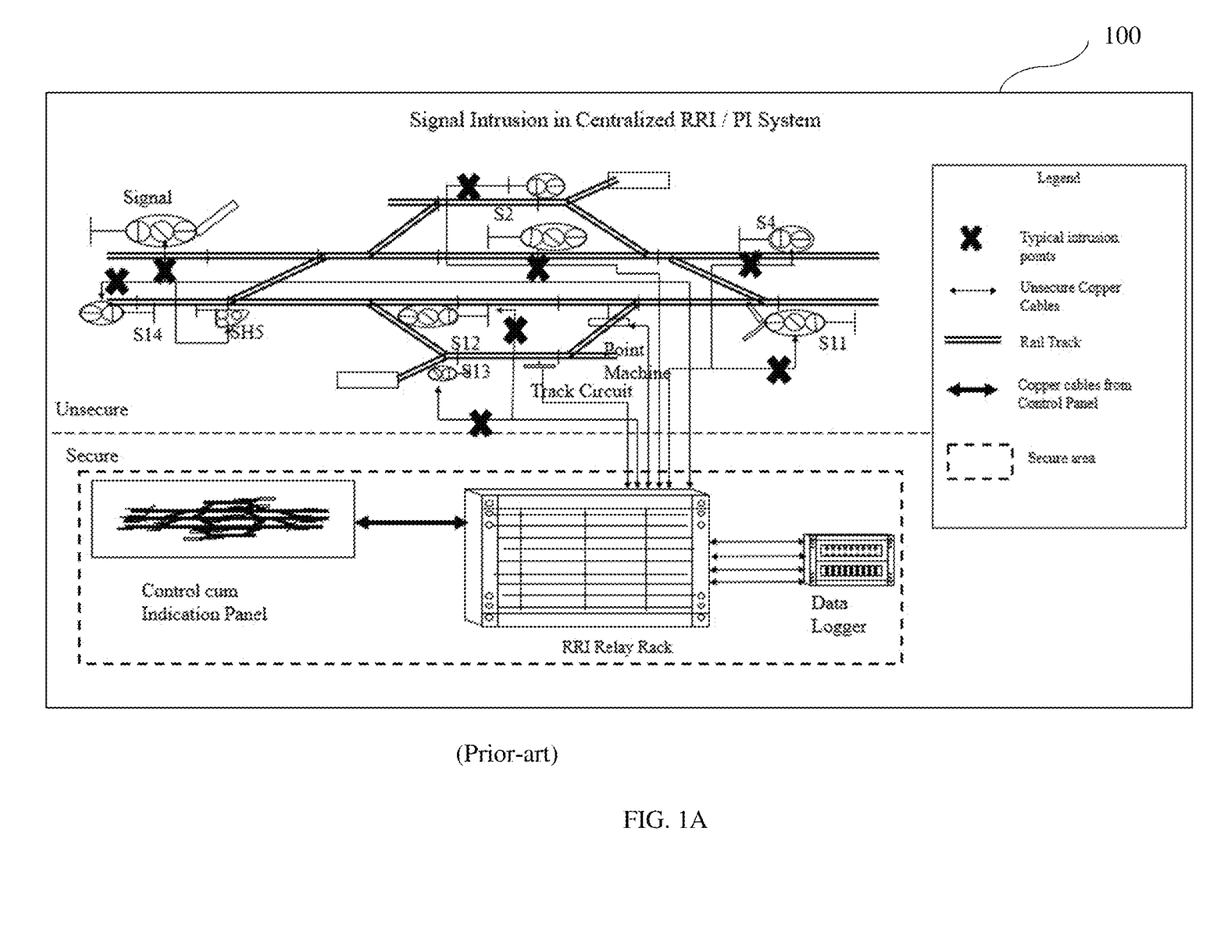
FIG. 1A through FIG. 1C illustrate schematic block diagrams of the major typical variations in traffic signalling networks in railways as known in the art.
Figure 1B:
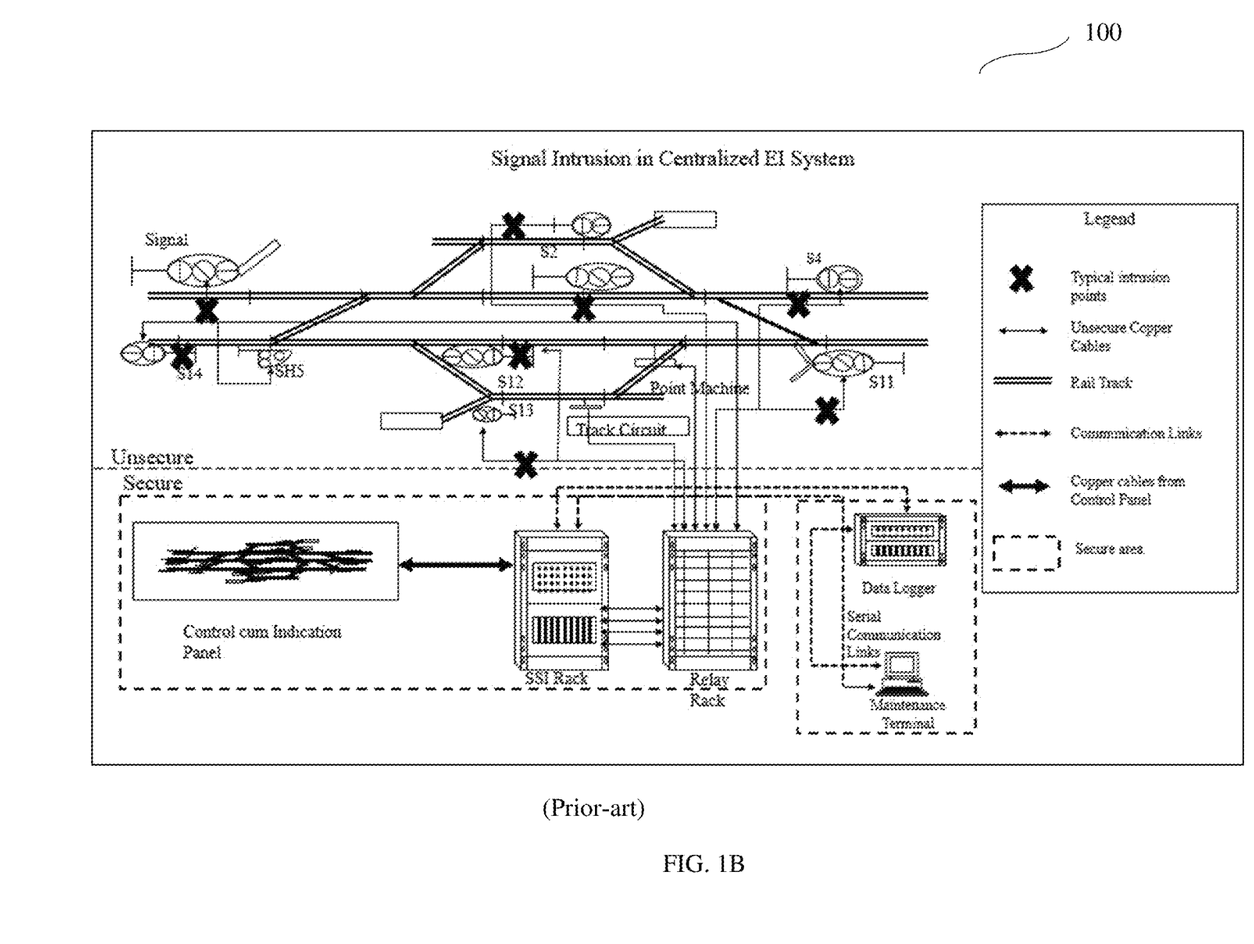
Figure 1C:
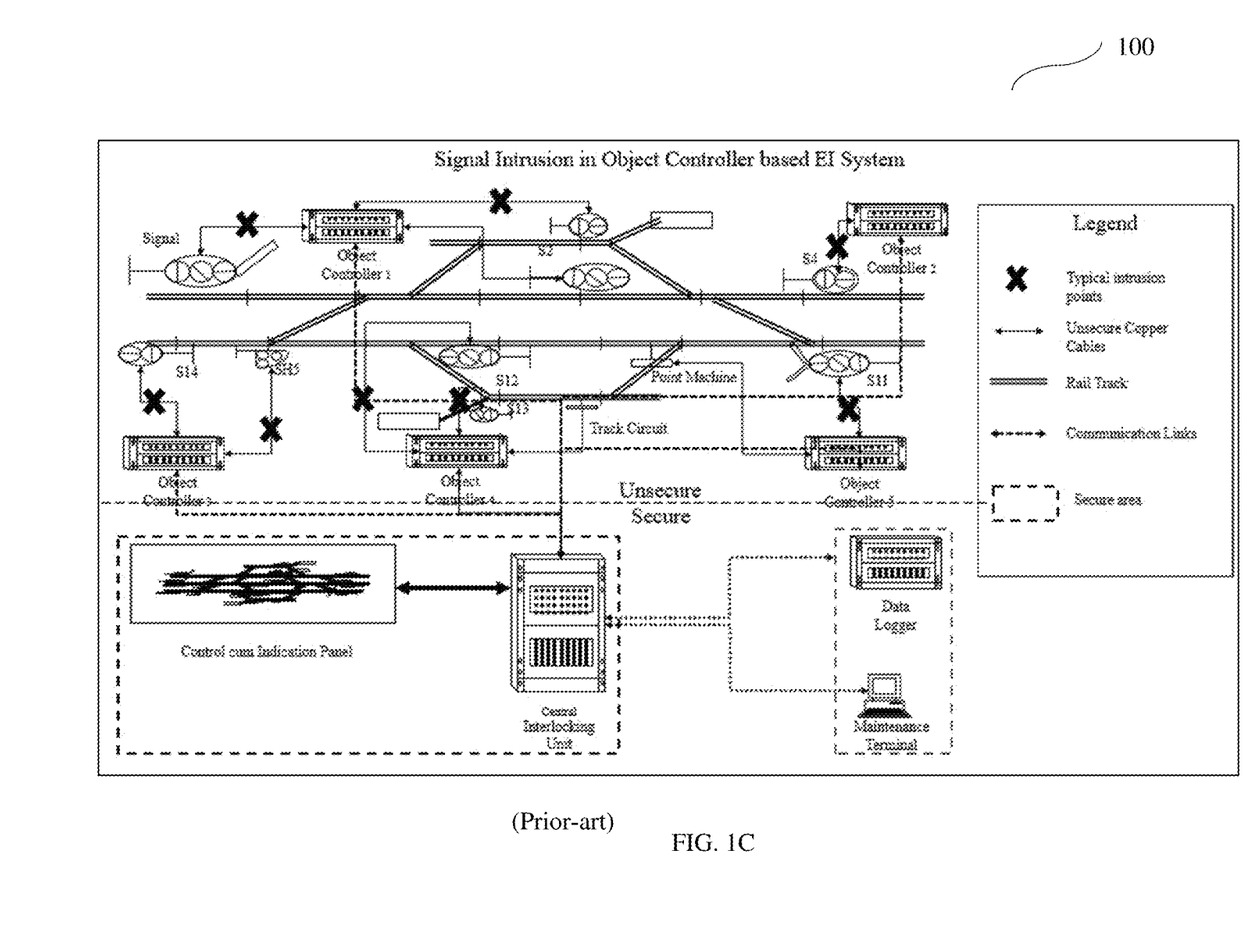
Figure 1D:
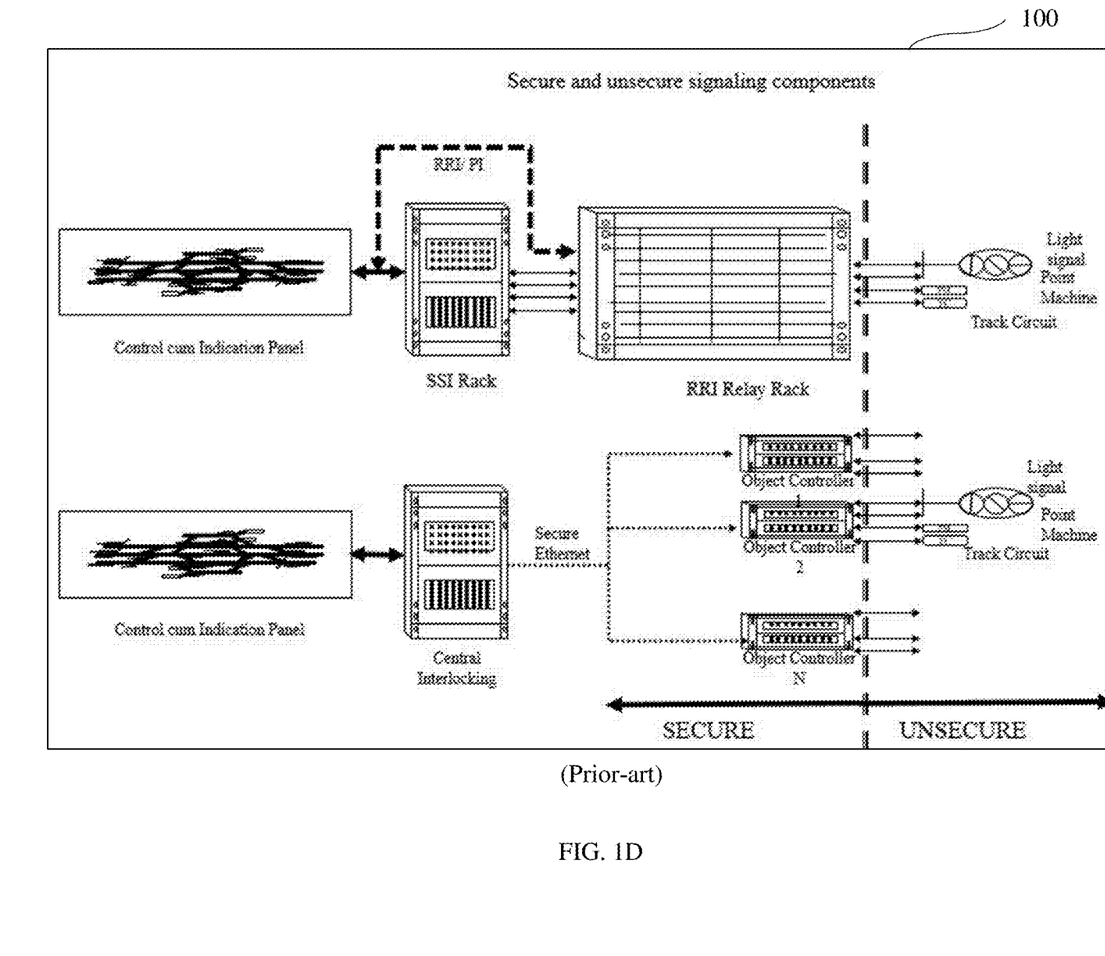
FIG. 1D through FIG. 1E illustrate communication between the Central Controller and signalling devices in an unsecure manner as known in the art.
Figure 1E:
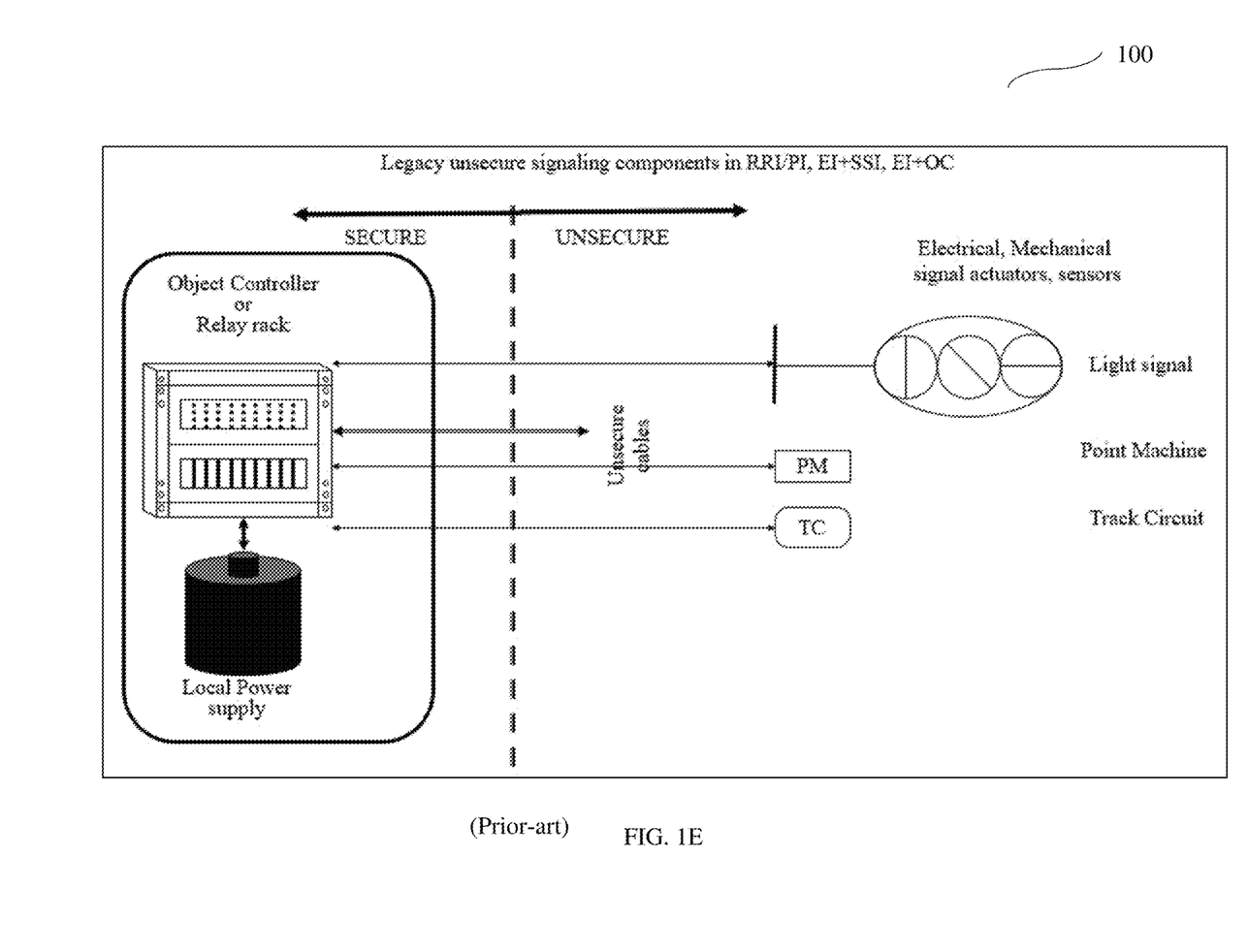
Figure 2:
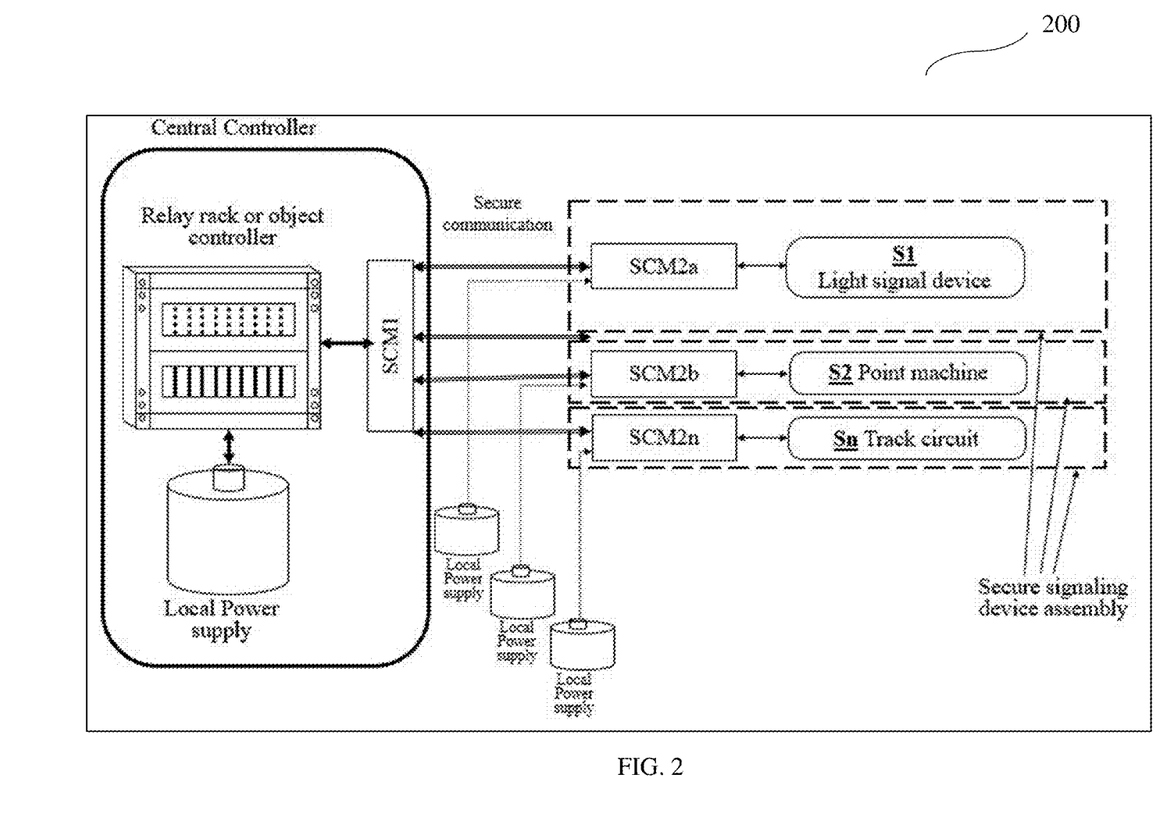
FIG. 2 illustrates a schematic block diagram of a system for securing communication between Central Controller and signaling devices in railway and road traffic signaling networks, according to an embodiment of the present disclosure.

Referring now to the drawings, and more particularly to FIG. 1A through FIG. 2, where similar reference characters denote corresponding features consistently throughout the figures, there are shown preferred embodiments and these embodiments are described in the context of the following exemplary system for securing signaling devices from intruders in railway and road traffic signaling networks.

FIG. 1A through FIG. 1C illustrate schematic block diagrams of the major typical variations in traffic signalling networks in railways where different railway interlocking technologies (RRI/PI, SSI/EI and EI with OC) are used, as known in the art, clearly identifying the exposed unsecure links of the communication networks. Intrusions on these elements would go undetected, potentially leading to unsafe traffic situations including collisions. FIG. 1D through FIG. 1E illustrate communication between the Central Controller and signalling devices in an unsecure manner as known in the art. The typical track circuit-based sensing and light signal and point machine actuators are depicted in FIG. 1D through FIG. 1E.

FIG. 2 illustrates a schematic block diagram of a system 200 for securing communication between Central Controller and signaling devices in railway and road traffic signaling networks, according to an embodiment of the present disclosure. The typical track circuit-based sensing and light signal and point machine actuators are depicted in the figure. The Central Controller comprising a relay rack or an object controller, which comprises at least one input relay and at least one output relay associated with each of the plurality of signaling devices present in the traffic signaling network.

The system 200 comprises a first secure communication module (SCM1) having a unique address identifier, operatively coupled to a relay rack or object controller, as relevant, and housed together with the same in a secure control facility or assembly permitting access only for traffic control staff and authorized officials. The secure control facility or assembly is situated at a specific field location for monitoring, guiding or controlling the traffic.

The system 200 comprises at least one second secure communication module SCM2 (SCM2a, SCM2b, . . . SCM2n) each having a unique address identifier. Each of the at least one SCM2 is integrated with a corresponding signaling device (S1, S2, . . . Sn) and housed together to form a corresponding secure signaling device assembly.

The system 200 comprises a physical communication link configured to establish a communication between the SCM1 and each of the at least one of SCM2 comprised in the corresponding secure signaling device assembly.

The system 200 also comprises a digital communication protocol, which implemented between the SCM1 and the at least one SCM2 via the physical communication link. The SCM1 and the at least one SCM2 establish a secure communication link between the relay rack or the object controller on one side and the plurality of signaling devices on other side. The digital communication protocol is configured to communicate relay status control commands or status information from the one side to the other side. A secure transmission is performed by way of authentication using the unique address identifier of the SCM1 and the at least one SCM2 as per the digital communication protocol. The secure communication link comprising the SCM1 and the at least one SCM2 is transparent to the Central Controller on the one side and the plurality of signaling devices on the other side. Hence the Central Controller is not aware that the SCM1 is present and similarly the plurality of signaling devices are not aware that the associated SCM2 is present.

In an embodiment, the SCM1 comprises a first digital input-output card IO1 configured to acquire relay ON/OFF status for one or more of the plurality of signaling devices. The relay ON/OFF status is acquired from spare contacts of associated output relays, when triggered by a change of voltage of the relay contacts or by reading their status continuously, based on the field configuration. The first digital input-output card IO1 then transmit the acquired relay ON/OFF status to an associated SCM2 along with the unique address identifier of the SCM1 and the associated SCM2. The first digital input-output card IO1 also send relay ON/OFF status acquired by an associated SCM2 into an associated input relay of the relay rack or the object controller based on the encrypted message and the unique address identifier of the at least one SCM2 and a connected or disconnected status of the physical communication link between the SCM1 and the associated SCM2.

The SCM1 also comprises a first processing unit P1 configured to encrypt the control commands and send to the associated at least one SCM2 or receive and decrypt the encrypted received messages corresponding to the relay ON/OFF status by implementing the digital communication protocol and using the unique address identifiers of the SCM1 and the associated at least one SCM2. The first processing unit P1 also convert the relay ON/OFF status, acquired by the first digital input-output card IO1, into a compatible form for sending through the physical communication link with the unique address identifier of the SCM1 and the associated at least one SCM2. The first processing unit P1 detect the connected or disconnected status of the physical communication link between the SCM1 and the associated at least one SCM2, and verify the authenticity of the message from the associated SCM2 of the corresponding signaling device received through the physical communication link and the validity of the message for the input relays in the relay rack or the object controller corresponding to the associated SCM2. The first processing unit P1 generate a relay ON/OFF status compatible with an associated relay to provide safe working of the railway or road traffic signaling networks, if the authentication fails or the input is invalid. If the verification of the authenticity and the validation successful, the first processing unit P1 convert the message received from the associated SCM2 into relay ON/OFF status compatible for the intended relay, to be sent by the first digital input-output card IO1 into the designated input relays in the relay rack or the object controller.

In an embodiment, the authenticity of the message is said to be verified, if the unique address identifier present in the message that is received from the associated SCM2 matches with the unique address identifier of the SCM1 and the associated SCM2. In an embodiment, the validity of the message is said to be verified if the status information comprised in the message is suitable for the corresponding signaling device.

In an embodiment, the safe working of the railway or road traffic signaling networks may be switching actuator devices to RED status until the verification of the authenticity and the validation is successful. During the RED status, no traffic is allowed from either of the side.

In an embodiment, the SCM1 and the relay rack or the object controller are powered by a common power source.

In an embodiment, each of the at least one SCM2 comprises a second digital input-output card IO2 configured to acquire a status of the corresponding signaling device, when triggered by a change of voltage of the corresponding signaling device relay contacts or by reading the status continuously, based on the field configuration. If the corresponding signaling device is an actuator device, then the associated IO2 send the control commands received from the SCM1 to set the desired status of the associated actuator device. The associated IO2 also acquire integrity status of the actuator device or signaling sensor assembly of the corresponding signaling device, if available.

Each of the at least one SCM2 also comprises a second processing unit P2 configured to encrypt and send the status of the corresponding signaling device to the SCM1 or receive and decrypt messages received from the SCM1 by implementing the digital communication protocol and using the unique address identifier of the SCM1 and the associated SCM2. The second processing unit P2 convert the status of the corresponding signaling device, acquired by the second digital input-output card IO2, into a compatible form for sending through the physical communication link with the unique address identifiers of the SCM1 and the associated SCM2. The second processing unit P2 verify the authenticity of the control command received from the SCM1 through the physical communication link, the validity of the control command for the associated actuator device, and acquired integrity status of the actuator device or signaling sensor assembly of the corresponding signaling device. The second processing unit P2 generate a message indicating failure of the verification to implement safe working of the railway or road traffic signaling networks, if the authentication fails. If the verification is successful and if the corresponding signaling device is the actuator device, the second processing unit P2 convert the control command received from the SCM1 into relay ON/OFF status compatible for the intended relay to be sent by the second digital input-output card IO2, to set the desired status of the corresponding actuator device. The second processing unit P2 also enable the SCM1 to detect the connected or disconnected status of the physical communication link between the SCM1 and the associated SCM2.

In an embodiment, the authenticity of the control command is said to be verified, if the unique address identifier present in the control command that is received from the SCM1 matches with the unique address identifier of the SCM1 and the associated SCM2. In an embodiment, the validity of control command is said to be verified if the status information comprised in the control command to be suitable for changing the corresponding signaling device to the desired status.

In an embodiment, the at least one SCM2 and the associated signaling device are powered by a common power source.

In an embodiment, the digital communication protocol implemented between the SCM1 and the at least one SCM2 via the physical communication link is a standard, industrial, secure, cryptography enabled communication protocol including but not limited to, Hyper Text Transfer Protocol Secure (TCP/HTTPS), secure MODBUS, and Ethernet for Control Automation Technology (EtherCAT) to ensure security and authenticity of the data and information communicated as well as to monitor the health or availability status of the SCM1, each of the plurality of SCM2s, as well the physical communication link between them. Safe working characteristics are implemented in the existing signaling systems comprising Central Controllers and signaling devices between which the SCM1 and the at least one SCM2s are transparently retro-fitted to ensure security.

In an embodiment, the SCM1 and the at least one of SCM2s use the same standard, industrial, secure, and digital cryptography enabled communication protocols to communicate at frequent intervals to ensure safety and security.

In an embodiment, the physical communication link is a metal cable or an Ethernet communication cable that is configurable between the SCM1 and the associated SCM2. The physical communication link is the Ethernet communication cable when a distance between the Central Controller and the corresponding secure signaling device assembly exceeds 50 metres.

In an embodiment, the digital input-output cards IO1 and IO2 of the SCM1 and the associated SCM2 may acquire and transmit to the input or output relay contacts of the relay rack or the object controller, or the actuator devices and signaling sensors at two set levels of positive Direct Current (DC) voltages.

In accordance with an embodiment of the present disclosure, each of the at least one SCM2 (SCM2a, SCM2b, ... SCM2n) is integrated for monitoring, guiding or controlling the traffic, with corresponding signaling sensor or actuator device situated at a specific field location, in the secure assembly or single functional block, making them physically and digitally secure from tampering and intrusion risks.

In accordance with an embodiment of the present disclosure, the SCM1 and the at least one SCM2 establish secure but transparent communications links between the relay rack or object controller on one side and signaling sensors and actuator devices on the other side over the physical communications link and are configured to communicate relay status control commands or status information from one side to the other, making the traffic signaling network secure and safe from intrusion and manipulation.

In accordance with an embodiment of the present disclosure, the system 200 can easily retro-fit transparently to the existing actuator devices and signaling sensors in both railway and road traffic signaling networks, just by configuring the SCM1 at the Central Controller or the relay rack or the object controller side, and equipping with the SCM2 at the signaling device side.

The system 200 provides security over and above safety to the actuator devices and signaling sensors from intrusion and other vulnerabilities as long as the secure communication is established between the Central Controller and the corresponding signaling device. The system 200 is economic as it comprises simple electronic circuitry mechanism, standard industrial communication protocols and is modular as it may be easily retro-fitted to the existing legacy traffic signal networks.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims (when included in the specification), the singular forms "a," "an," and "the" include plural references unless the context clearly dictates otherwise.

It is intended that the disclosure and examples be considered as exemplary only, with a true scope and spirit of disclosed embodiments being indicated by the following claims.

The invention claimed is:

1. A system for securing communication between a Central Controller and a plurality of signaling devices in railway or road traffic signaling networks, the Central Controller comprising a relay rack or an object controller, which comprises at least one input relay and at least one output relay associated with each of the plurality of signaling devices, the system comprising a first secure communication module (SCM1) having a unique address identifier, operatively coupled to the relay rack or the object controller, and together housed in a secure control facility; at least one second secure communication module (SCM2) each having a unique address identifier, wherein each of the at least one SCM2 is integrated with a corresponding signaling device and housed together to form a corresponding secure signaling device assembly; a physical communication link configured to establish a communication between the SCM1 and each of the at least one SCM2; and a digital communication protocol, implemented between the SCM1 and the at least one SCM2 via the physical communication link, wherein the SCM1 and the at least one SCM2 establish a secure communication link between the relay rack or the object controller on one side and the plurality of signaling devices on other side and the digital communication protocol is configured to communicate relay status control commands or status information from the one side to the other side, wherein a secure transmission is performed by way of authentication using the unique address identifier of the SCM1 and the at least one SCM2 as per the digital communication protocol, and the secure communication link comprising the SCM1 and the at least one SCM2 is transparent to the Central Controller on the one side and the plurality of signaling devices on the other side.

2. The system of claim 1, wherein the SCM1 comprises a first digital input-output card (I01) configured to: acquire relay ON/OFF status from spare contacts of associated output relays for one or more of the plurality of signaling devices, when triggered by a change of voltage of the relay contacts or by reading the status continuously, based on a field configuration, and transmit to an associated SCM2 with the unique address identifier of the SCM1 and the associated SCM2; and send relay ON/OFF status acquired by an associated SCM2, into an associated input relay of the relay rack or the object controller: based on the encrypted message and the unique address identifier of the at least one SCM2; and based on a connected or disconnected status of the physical communication link between the SCM1 and the associated SCM2; and a first processing unit P1 configured to: encrypt the control commands and send to the associated at least one SCM2 or receive and decrypt the encrypted received messages corresponding to the relay ON/OFF status by implementing the digital communication protocol and using the unique address identifiers of the SCM1 and the associated at least one SCM2; convert the relay ON/OFF status, acquired by the first digital input-output card (I01), into a compatible form for sending through the physical communication link with the unique address identifier of the SCM1 and the associated at least one SCM2; detect the connected or disconnected status of the physical communication link between the SCM1 and the associated at least one SCM2; verify the authenticity of the message from the associated SCM2 of the corresponding signaling device received through the physical communication link and the validity of the message for the input relays in the relay rack or the object controller corresponding to the associated SCM2; and perform one of generating a relay ON/OFF status compatible with an associated relay to provide safe working of the railway or road traffic signaling networks, if the authentication fails or the input is invalid (ii) converting the message received from the associated SCM2 into relay ON/OFF status compatible for the intended relay, to be sent by the first digital input-output card I01 into the designated input relays in the relay rack or the object controller, if the verification of the authenticity and the validation is successful.

3. The system of claim 2, wherein each of the at least one SCM2 comprises: a second digital input-output card 102 configured to: acquire a status of the corresponding signaling device, when triggered by a change of voltage of the corresponding signaling device relay contacts or by reading the status continuously, based on a field configuration; if the corresponding signaling device is an actuator device, then send to the corresponding signaling device, the control commands received from the SCM1 to set the desired status of the associated actuator device; and acquire integrity status of the actuator device or signaling sensor assembly of the corresponding signaling device, if available; and ii. a second processing unit P2 configured to: encrypt and send the status of the corresponding signaling device to the SCM1 or receive and decrypt messages received from the SCM1 by implementing the digital communication protocol and using the unique address identifiers of the SCM1 and the associated SCM2; convert the status of the corresponding signaling device acquired by the second digital input-output card I02, into a compatible form for sending through the physical communication link with the unique address identifiers of the SCM1 and the associated SCM2; verify (i) the authenticity of the control command received from the SCM1 through the physical communication link (ii) the validity of the control command for the associated actuator device, and (iii) acquired integrity status of the actuator device or signaling sensor assembly of the corresponding signaling device; perform one of (i) generating a message indicating failure of the verification to implement safe working of the railway or road traffic signaling networks, if the authentication fails or (ii) if the verification is successful and the corresponding signaling device is device, convert the control command received from the SCM1 into relay ON/OFF status compatible for the intended relay to be sent by the second digital input-output card I02, to set the desired status of the corresponding actuator device; and o enable the SCM1 to detect the connected or disconnected status of the physical communication link between the SCM1 and the associated SCM2.

4. The system of claim 1, wherein the digital communication protocol is either Hyper Text Transfer Protocol Secure (TCP/HTTPS), secure MODBUS, or Ethernet for Control Automation Technology (EtherCAT).

5. The system of claim 1, wherein the physical communication link is a metal cable or an Ethernet communication cable.

6. A system of claim 1, wherein the SCM1 and the relay rack or the object controller are powered by a common power source.

7. A system of claim 1, wherein the at least one SCM2 and the associated signaling device are powered by a common power source.

* * * * *